(12) United States Patent
Gu

(10) Patent No.: US 6,834,884 B2
(45) Date of Patent: Dec. 28, 2004

(54) AIRBAG

(75) Inventor: Weixin Gu, Shiga (JP)

(73) Assignee: Takata Corporation, Tokyo (JP)

( * ) Notice: Subject to any disclaimer, the term of this patent is extended or adjusted under 35 U.S.C. 154(b) by 69 days.

(21) Appl. No.: 10/293,299

(22) Filed: Nov. 14, 2002

(65) Prior Publication Data

US 2003/0107205 A1 Jun. 12, 2003

(30) Foreign Application Priority Data

Dec. 6, 2001 (JP) ........................................ 2001-372950

(51) Int. Cl.$^7$ .............................................. B60R 21/24
(52) U.S. Cl. ..................... 280/729; 280/742; 280/743.1
(58) Field of Search .............................. 280/729, 743.1, 280/743.2, 740, 742, 731

(56) References Cited

U.S. PATENT DOCUMENTS

| | | | | |
|---|---|---|---|---|
| 5,253,892 A | * | 10/1993 | Satoh | 280/731 |
| 5,941,559 A | * | 8/1999 | Rudolf et al. | 280/729 |
| 5,957,493 A | * | 9/1999 | Larsen et al. | 280/743.1 |
| 6,086,092 A | * | 7/2000 | Hill | 280/729 |
| 6,199,898 B1 | * | 3/2001 | Masuda et al. | 280/730.2 |
| 6,224,101 B1 | * | 5/2001 | Nishijima et al. | 280/743.2 |
| 6,382,662 B1 | * | 5/2002 | Igawa | 280/729 |
| 2002/0041090 A1 | | 4/2002 | Wohllebe et al. | |
| 2003/0034637 A1 | | 2/2003 | Wang et al. | |

FOREIGN PATENT DOCUMENTS

| | | |
|---|---|---|
| JP | 1-247242 | 10/1989 |
| WO | 00/03898 | 1/2000 |

* cited by examiner

Primary Examiner—David R. Dunn
(74) Attorney, Agent, or Firm—Manabu Kanesaka

(57) ABSTRACT

An airbag is partitioned into the first chamber disposed at a center thereof, the second chamber surrounding the first chamber, and a gas-receiving chamber by means of an inner panel and a partition panel. The first chamber is located inside the inner panel above the partition chamber. The gas-receiving chamber is located inside the inner panel between the partition chamber and an inflator. When the inflator is actuated, gas from the inflator first flows into the gas-receiving chamber, and from this gas-receiving room, it flows into the first and second chambers substantially through communication ports, thereby inflating the first and second chambers substantially at the same time.

10 Claims, 4 Drawing Sheets

AIRBAG

BACKGROUND OF THE INVENTION AND RELATED ART STATEMENT

The present invention relates to an airbag for protecting a person by rapidly expanding in case of an emergency such as a collision of a high-speed moving body such as a vehicle.

In order to protect an occupant in a car in case of an emergency such as a collision of the car, various airbag devices such as an airbag device for a driver have been used. The airbag device for the driver has an airbag formed by sewing peripheral edge portions of a front panel on the occupant side and a rear panel on the side opposite to the occupant side. An opening for an inflator is provided in the center of the rear panel for receiving a front end of the inflator. The airbag is attached to a retainer around the opening by bolts, pins, rivets or the like. The rear panel has vent holes for venting gas in the airbag to absorb an impact when an occupant on the driver seat plunges into the airbag.

Japanese Patent Publication (KOKAI) No. 01-247242 discloses an airbag in which an inner panel is provided so as to act as a bridge between an opening for an inflator in the rear panel and the front panel, and the inside of the airbag is partitioned into the first chamber disposed at the center of the airbag and the second chamber surrounding the first chamber. The inner panel has a substantially circular shape in a plan view, and an outer peripheral edge portion thereof is connected to a middle portion between the center and the periphery edge of the front panel. The opening for the inflator is provided at the center of the inner panel, and the edge portion of the opening is affixed to a retainer together with the rear panel. The inner panel has communication ports for allowing the first chamber to communicate with the second chamber. Once the inflator is actuated, the first chamber is inflated first, and then the second chamber is inflated. The second chamber is inflated completely later than the first chamber because the gas flows into the second chamber from the first chamber through the communication ports.

It is an object of the present invention to provide an airbag in which the first chamber and the second chamber completely inflate almost at the same time.

Further objects and advantages of the invention will be apparent from the following description of the invention.

SUMMARY OF THE INVENTION

According to the present invention, an inside of an airbag is partitioned into a plurality of chambers, and the airbag is inflated by gas from an inflator. The airbag includes a gas-receiving chamber for receiving the gas from the inflator, and communication ports provided so as to supply the gas directly to each of the chambers from the gas-receiving chamber.

In this airbag, when the inflator is actuated, the gas from the inflator is introduced into the gas-receiving chamber first, and is distributed directly to each of the chambers from the gas-receiving chamber (for example, the first chamber and the second chamber) through the communication ports, thereby inflating all chambers substantially at the same time.

According to the present invention, the airbag includes a front panel disposed on a side facing an occupant and a rear panel disposed on a side opposite to the occupant. The front panel and the rear panel are connected at their peripheral edge portions with each other. In this airbag, an opening for the inflator is provided at the center of the rear panel. An inner panel is provided to divide the inside of the airbag into a central first chamber and the second chamber surrounding the first chamber. An opening is provided at the center of the inner panel as a substantially concentric circle relative to the opening of the rear panel. A peripheral edge portion of the inner panel is connected to an intermediate portion between the central portion and a peripheral edge portion of the front panel. A partition panel is attached to the inner panel for dividing the inside of the first chamber, thereby forming the gas-receiving chamber on a side of the opening for the inflator. The partition panel is provided with communication ports for connecting the gas-receiving chamber to the first chamber. Further, the inner panel is provided with communication ports for connecting the gas-receiving chamber to the second chamber.

In the airbag, since the front panel is connected to the edge portion of the opening for the inflator via the inner panel, the connection between the front panel and the opening for the inflator is significantly strong.

According to another aspect of the present invention, an airbag includes a front panel disposed on a side facing an occupant and a rear panel disposed on a side opposite to the occupant. The front panel and the rear panel are connected at their peripheral edge portions with each other. In this airbag, an opening for the inflator is provided at the center of the rear panel. An inner panel is provided to divide the inside of the airbag into the first chamber disposed at the center of the airbag and the second chamber surrounding the first chamber. A partition panel is provided to form a gas-receiving chamber between the inner panel and the opening for the inflator. An opening is provided at the center of the partition panel as a substantially concentric circle with the opening of the rear panel. A peripheral edge portion of the partition panel is connected to an intermediate portion between the central portion and a peripheral edge portion of the inner panel. The inner panel is provided with communication ports for connecting the gas-receiving chamber to the first chamber. Further, the partition panel is provided with communication ports for connecting the gas-receiving chamber to the second chamber.

In the airbag, through strong connection between the partition panel and the inner panel, it is possible to attach the front panel strongly to the edge portion of the opening for the inflator in the rear panel.

According to still another aspect of the present invention, an airbag includes a front panel disposed on a side facing an occupant and a rear panel disposed on a side opposite to the occupant. The front panel and the rear panel are connected at their peripheral edge portions with each other. In this airbag, an opening for the inflator is provided at the center of the rear panel. An inner panel is provided to divide the inside of the airbag into the first chamber disposed at the center of the airbag and the second chamber surrounding the first chamber. A cylindrical partition panel is provided, and the inside of the cylindrical partition panel is formed as a gas-receiving chamber. The partition panel has an opening disposed substantially concentrically with the opening of the rear panel. A peripheral edge portion of the inner panel is connected to the front panel, and the central portion of the inner panel is connected to the partition panel. Communication ports for allowing the first chamber to communicate with the gas-receiving chamber are provided in each of the inner panel and the partition panel, and end portions of the cylindrical partition panel constitute communication ports for allowing the gas-receiving chamber to communicate with the second chamber.

In this airbag, the gas can be ejected to the second chamber from the cylindrical partition panel in a longitudinal direction of the cylinder, thereby allowing the second chamber to be rapidly inflated in an expanding direction of the airbag.

According to the present invention, the airbag may be arranged such that vent holes are provided in the rear panel, and the inner vent holes for connecting the first chamber to the second chamber are provided in the inner panel. When the occupant plunges into the first chamber, the gas in the first chamber flows into the second chamber through the inner vent holes, and then the gas flows out from the vent holes, thereby absorbing an impact.

DETAILED DESCRIPTION OF PREFERRED EMBODIMENTS

Hereunder, embodiments of the present invention will be described with reference to the accompanied drawings.

Figure 1:
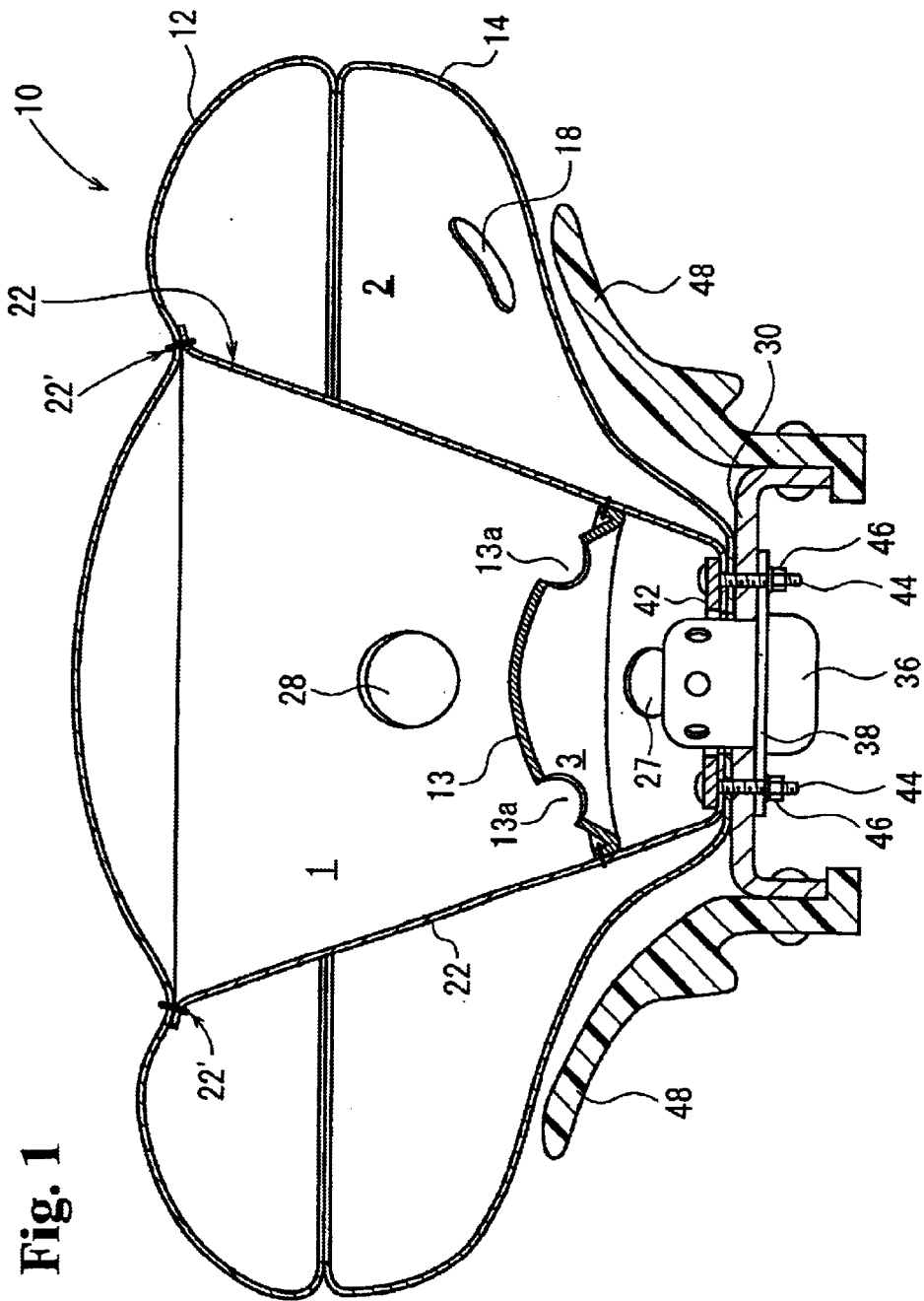
FIG. 1 is a sectional view showing an airbag device equipped with an airbag according to an embodiment of the present invention.
Figure 2:
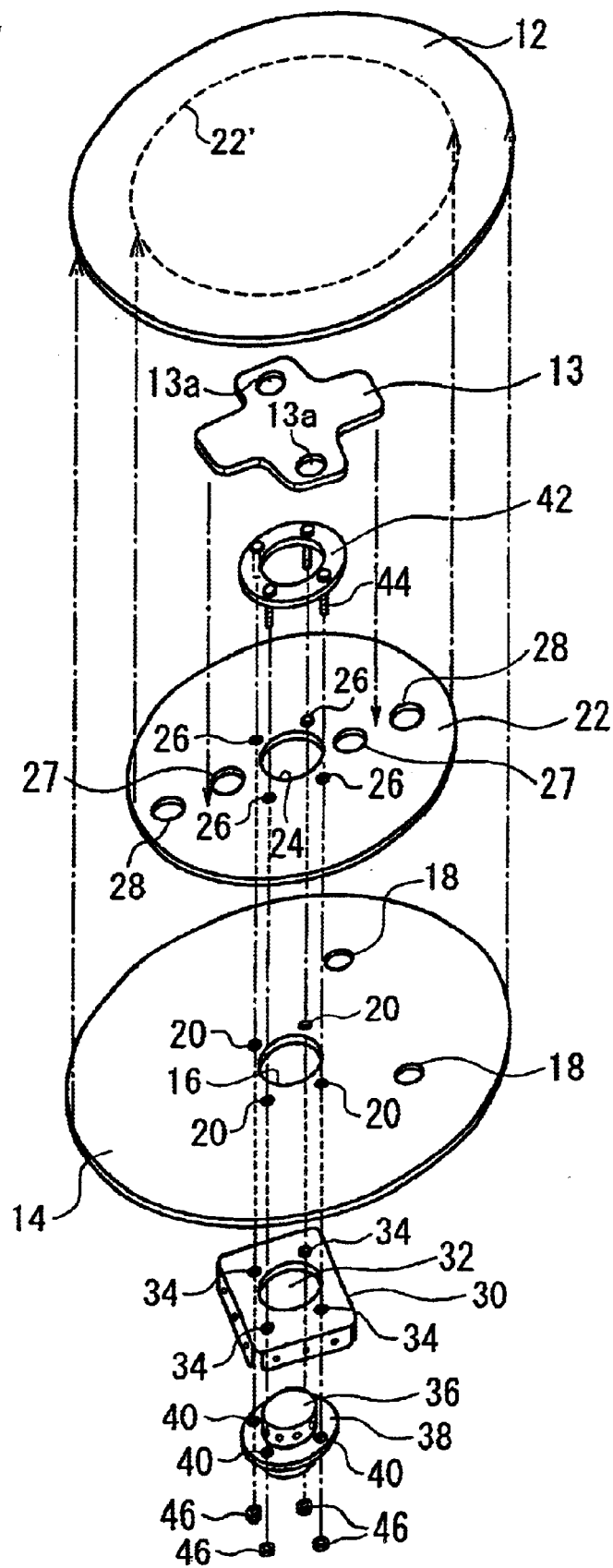
FIG. 2 is an exploded perspective view illustrating the airbag device shown in FIG. 1.

FIG. 1 is a sectional view showing an airbag device equipped with an airbag for use in a driver seat of a car, according to an embodiment of the present invention, in which the airbag is in an inflated state. FIG. 2 is an exploded perspective view showing the airbag and the airbag device.

An airbag 10 has a front panel 12, a rear panel 14, and an inner panel 22, each being constituted of a woven circular cloth, and also has a partition panel 13 connected to the inner panel 22. The front panel 12 and the rear panel 14 have the same diameter, and are formed in a bag shape by sewing outer peripheral edge portions thereof. The sewn portion constitutes an annular shape along the outer peripheries of the front panel 12 and the rear panel 14.

The rear panel 14 has an opening 16 for an inflator and vent holes 18. The opening 16 for an inflator in the rear panel 14 is disposed at the center of the rear panel 14. Bolt through-holes 20 are provided around the opening 16 for the inflator.

Inside the airbag 10, there is provided the inner panel 22. The inner panel 22 is disposed substantially concentrically with the front panel 12 and the rear panel 14, and the peripheral edge portions thereof are sewn to a middle portion between the central portion and the peripheral edge portion of the front panel 12. Reference numeral 22' denotes this sewn portion (seam) The seam 22' has an annular shape.

At the center of the inner panel 22, an opening 24 for the inflator is provided substantially concentrically with the opening 16 for the inflator in the rear panel 14. These openings 16 and 24 have substantially the same diameter. Bolt through-holes 26 of the rear panel 14 overlying the bolt through-holes 20 are provided around the opening 24 of the inner panel 22.

The inner panel 22 includes inner vent holes 28 provided relatively close to the outer peripheral edge thereof, and communication ports 27 provided further toward the inner peripheral side than the inner vent holes 28.

The partition panel 13, which has a size enough to cover the above-described communication ports 27 and the opening 24 for the inflator disposed at the center, are superposed on the inner panel 22, and the peripheral edge portion of the partition panel 13 is sewn to the inner panel 22. The partition panel 13 has communication ports 13a.

The peripheral edge portion of the opening 24 for the inflator in the inner panel 22 is superposed on that of the opening 16 for the inflator in the rear panel 14, and is further superposed on the peripheral edge portion of an inflator installation opening 32 of the retainer 30. The peripheral edge portions of the openings 24 and 16 for the inflator are fixed to the retainer 30 through the bolt through-holes 26 and 20, respectively. As a result, the peripheral edge portion of the opening 24 for the inflator in the inner panel 22 is joined with that of the opening 16 for the inflator in the rear panel 14, and the peripheral edge portion of the inner panel 22 is joined with the front panel 12 by the sewn portion 22'.

By these inner panel 22 and partition panel 13, the inside of the airbag 10 is partitioned into a first chamber 1 disposed at the center, a second chamber 2 surrounding the first chamber 1, and a gas-receiving chamber 3. The first chamber 1 is located at an inside of the inner panel 22 above the partition chamber 13. The gas-receiving chamber 3 is located at an inside of the inner panel 22 between the partition chamber 13 and the inflator 36. Here, the partition chamber 13 has a substantially cruciform shape, but the shape thereof is not limited to the cruciform shape.

In this embodiment, two pieces of the cruciform partition panel 13, which extend to sides opposite to each other, have communication ports 13a therein, and the two remaining pieces thereof overlay the communication ports 27. The communication ports 13a and the inner vent holes 28 are mutually out of phase in a circumferential direction with respect to the center of the airbag.

A reinforcement patch or the like may be affixed to the peripheral edge portion of each of the openings 16 and 24, the communication ports 27, and the vent holes 28.

The retainer 30 for installing the airbag 10 has an inflator installation opening 32 disposed at the center thereof, and has bolt through-holes 34 disposed therearound. The flange 38 of the inflator 36 has bolt through-holes 40. The inflator 36 is fitted into the inflator installation opening 32 of the retainer 30.

When the airbag 10 is to be affixed to the retainer 30, the peripheral edge portions of the openings 16 and 24 for the inflator in the rear panel 14 and the inner panel 22 are pressed against the peripheral edge portion of the inflator installation opening 32 of the retainer, using a retaining ring 42.

In this case, stud bolts 44 of the retaining ring 42 pass through the bolt through-holes 26, 20, 34, and 40, and each of the stud bolts is fastened at a front end with a nut 46, thereby fixing the inner panel 22, the airbag 10 and the inflator 36 to the retainer 30. Then, the airbag 10 is folded, and a module cover 48 is affixed to the retainer 30 so as to cover the folded body of the airbag 10, thereby constituting the airbag device. This airbag device is mounted to the steering wheel (not shown) of the car.

Upon collision of the vehicle, the inflator 36 is actuated, and gas is ejected into the airbag 10. The airbag 10 is inflated by the gas and pushes the module cover 48 to open. Then, the airbag 10 is developed in the interior of the vehicle and protects an occupant on the driver seat. Herein, the gas from the inflator 36 first flows into the gas-receiving chamber 3, and from the gas-receiving chamber 3, the gas flows into the first chamber 1 and the second chamber 2 substantially at the same time through the communication ports 13a and 27, thereby inflating the first and second chambers 1 and 2 substantially at the same time.

When the occupant plunges into the inflated airbag 10, the inside gas flows out through the vent holes 18 or the inner vent holes 28, thereby absorbing an impact.

In the present invention, an inner panel and a partition panel shown in FIGS. 3(a) to 3(d) may be employed, as described below.

Figure 3A:
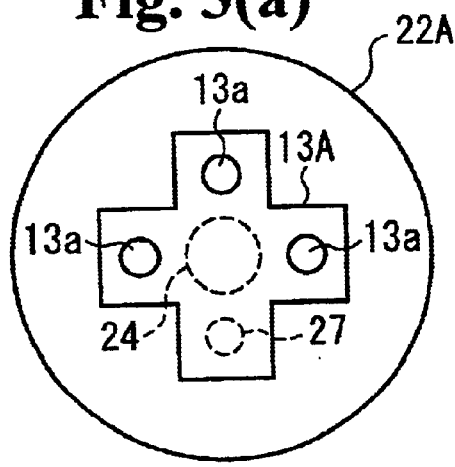
FIGS. 3(a)–3(d) are representations of other embodiments of an inner panel according to the present invention.

In FIG. 3(a), an inner panel 22A has one communication port 27, and a cruciform partition panel 13A has three communication ports 13a. The communication ports 13a are disposed in three pieces of the cruciform partition panel 13A, and the one remaining piece thereof overlies the communication port 27.

Figure 3B:
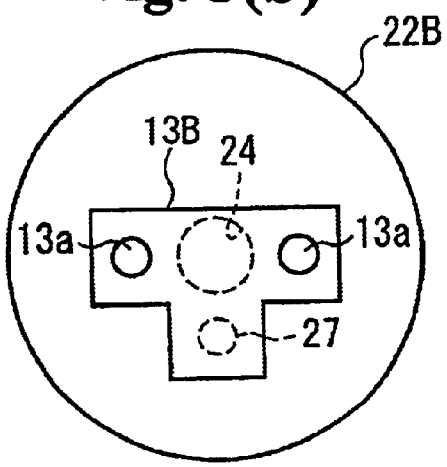
Figure 3D:
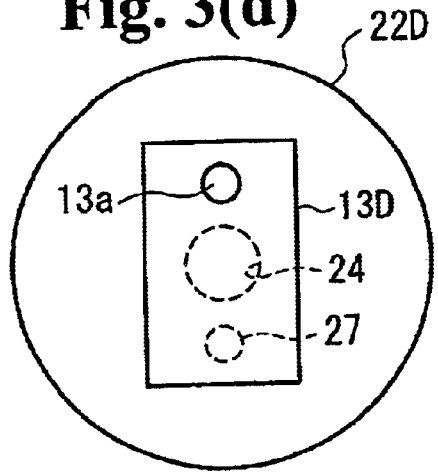
Figure 3C:
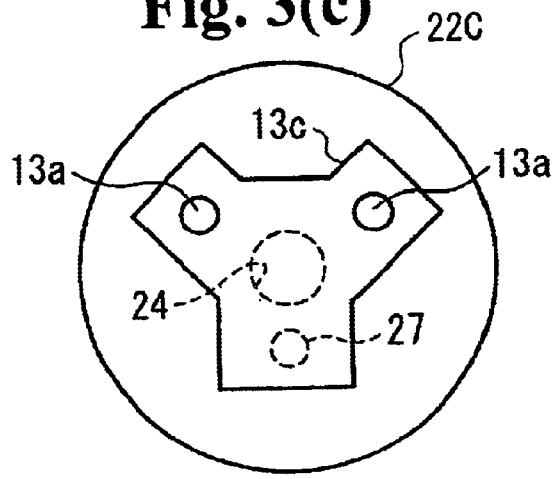

In FIGS. 3(b) and 3(c), an inner panel 22B has one communication port 27, and partition panels 13B and 13C with three pieces have two communication ports 13a. The communication ports 13a are provided in two pieces of each of the partition panels 13B and 13C, and the one remaining piece of each of the partition panels 13B and 13C overlies the communication port 27. Here, the partition panel 13B in FIG. 3(b) has a T-shape, and the communication ports 13a thereof are provided in the two pieces thereof that extend in the directions opposite to each other. In FIG. 3(c), the partition panel 13C is constituted of three pieces that extend in the directions toward positions on the circumference of the inner panel 22C, the positions substantially trisecting the circumference.

In FIG. 3(d), an inner panel 22D has one communication port 27, and a rectangular partition panel 13D has one communication port 13a. The communication port 13a and the communication port 27 are disposed on sides opposite to each other with the opening 24 for the inflator therebetween.

Figure 4:
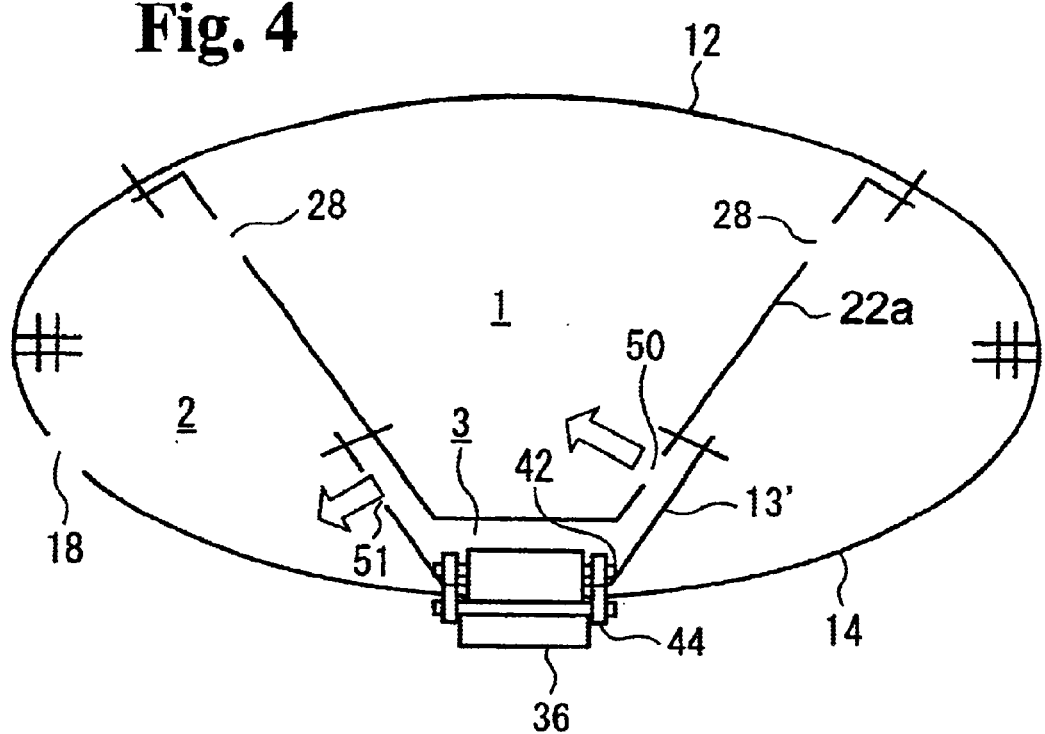
FIG. 4 is a sectional view showing an airbag according to another embodiment of the present invention.
Figure 5:
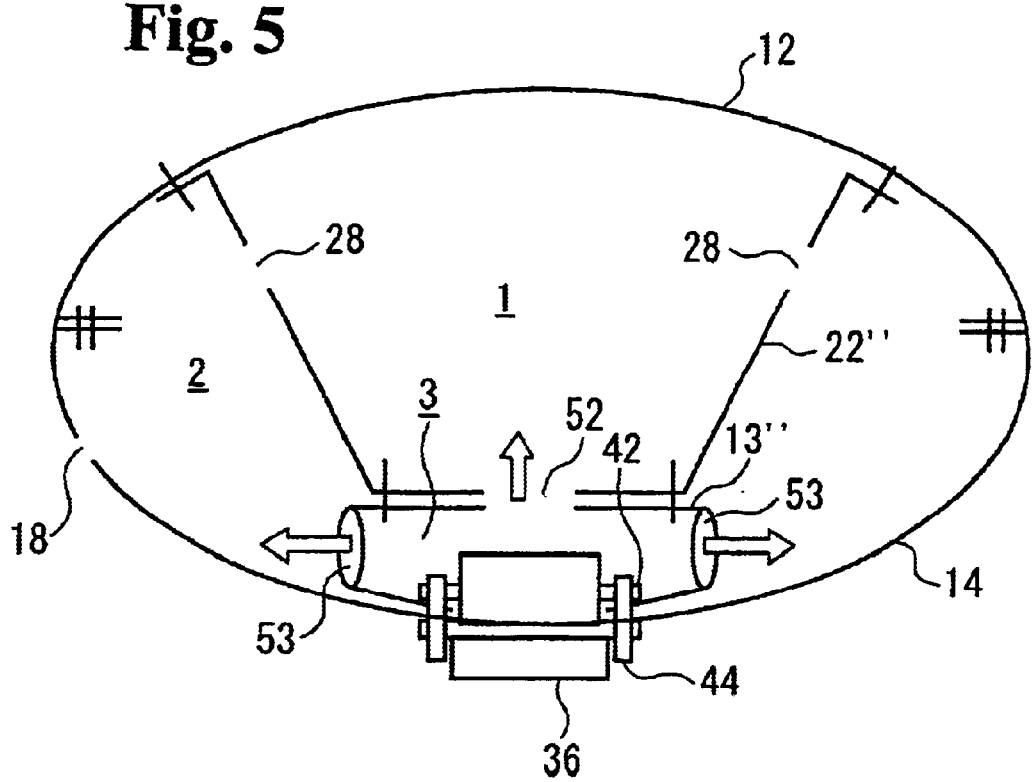
FIG. 5 is a sectional view showing an airbag according to still another embodiment of the present invention.

FIGS. 4 and 5 are sectional views showing airbags according to other embodiments of the present invention, in which the airbags are in an inflated state.

In the airbag shown in FIG. 4, a partition panel 13' is interposed between the inner panel 22a and the inflator 36. The outer peripheral end of the partition panel 13' is connected to the middle between the center and the peripheral edge of the inner panel 22a (however, at a position toward the center side relative to the inner vent hole 28). The inner peripheral end of the partition panel 13' is connected to the rear panel 14 and the retainer 30 (not shown in FIG. 4) using the retaining ring 42.

The gas from the inflator 36 directly flows into the first and second chambers 1 and 2 from the gas-receiving chamber 3 disposed between the vicinity of the central portion of the inner panel 22a and the partition panel 13', through communication ports 50 and 51, thereby inflating the first and second chambers 1 and 2 substantially at the same time.

In the airbag shown in FIG. 5, a cylindrical partition panel 13" is interposed between the vicinity of the central portion of an inner panel 22" and the inflator 36. The partition panel 13" is arranged so that the cylinder axis direction thereof extends along the retainer 30 (not shown in FIG. 5). The partition panel 13" has an opening for the inflator provided on the bottom surface side thereof, and the peripheral edge portion of the opening for the inflator is connected to the retainer 30 and the rear panel 14 using the retaining ring 42. The inside of the cylindrical partition panel 13" constitutes the gas-receiving chamber 3, and the two ends thereof form communication ports 53.

The top surface side of the partition panel 13" is connected to the vicinity of the center of the inner panel 22". The partition panel 13" and the inner panel 22" have a communication port 52 for allowing the inside of the gas-receiving chamber 3 to communicate with the first chamber 1 in the inner panel 22".

Once the inflator 36 is actuated, the gas directly flows into the first and second chambers 1 and 2 from the communication ports 52 and 53 through the gas-receiving chamber 3, thereby inflating the first and second chambers 1 and 2 substantially at the same time.

The partition panels according to the above-described embodiments are sewn to the inner panel over the entire periphery thereof. However, the partition panel may be arranged so that one portion of the surrounding thereof is not sewn but is left as an opening, instead of providing the partition panel with communication ports. In this case, the gas from the inflator once flows into the gas-receiving chamber, and then flows into the first and second chambers from the aforementioned opening formed by the non-sewn portion of the partition panel, and the communication ports 27 of the inner panel.

As described above in detail, according to the present invention, in the airbag with the inside partitioned into a plurality of chambers by the inner panel, the gas from the inflator is directly supplied from the gas-receiving chamber to each of the chambers, and therefore, all chambers complete the inflation thereof substantially at the same time, thereby reducing the time required to complete the inflation of the airbag.

While the invention has been explained with reference to the specific embodiments of the invention, the explanation is illustrative and the invention is limited only by the appended claims.

What is claimed is:

1. An airbag to be inflated by gas from an inflator, comprising:
   a main body having a front side and a rear side,
   a plurality of chambers disposed in the main body,
   an inner panel for partitioning an inside of the airbag into a first chamber disposed at a center of the airbag and a second chamber surrounding the first chamber, as said plurality of chambers,
   a gas-receiving chamber disposed in the main body for receiving the gas from the inflator, said gas-receiving chamber being located behind the first chamber separately therefrom, and
   communication ports communicating directly from the gas-receiving chamber to the plurality of the chambers so that the gas is supplied from the gas-receiving chamber to the plurality of the chambers.

2. An airbag according to claim 1, wherein said inner panel includes a first opening disposed at a center thereof, a peripheral edge portion connected to a middle portion between a central portion and a peripheral portion of the front side of the main body, and a first communication port for allowing the gas-receiving chamber to communicate with the second chamber, said airbag further including a partition panel connected to the inner panel for partitioning an inside of the first chamber to thereby form the gas-receiving chamber on the rear side of the main body, said partition panel having a second communication port for allowing the gas-receiving chamber to communicate with the first chamber.

3. An airbag according to claim 2, wherein said main body is formed of a front panel facing an occupant of a vehicle, and a rear panel located at a side opposite to the front panel and connected with each other at peripheral edge portions to form a bag shape in an inflated state, said rear panel having a second opening to be connected to the inflator at a center thereof and arranged substantially concentrically with the first opening.

4. An airbag according to claim 3, wherein said rear panel has vent holes, and said inner panel has inner vent holes for allowing the first chamber to communicate with the second chamber.

5. An airbag according to claim 1, wherein said inner panel has a first communication port for allowing the gas-receiving chamber to communicate with the first chamber, said airbag further including a partition panel disposed between the inner panel and the rear side of the main body to form the gas-receiving chamber, said partition panel having a first opening disposed at a center thereof, a peripheral edge portion connected to a middle portion between a central portion and a peripheral edge portion of the inner panel, and a second communication port for allowing the gas-receiving chamber to communicate with the second chamber.

6. An airbag according to claim 5, wherein said main body is of a front panel facing an occupant of a vehicle, and a rear panel located at a side opposite to the front panel and connected with each other at peripheral edge portions to form a bag shape in an inflated state, said rear panel having a second opening to be connected to the inflator at a center thereof and arranged substantially concentrically with the first opening.

7. An airbag according to claim 1, wherein said inner panel has a peripheral edge portion connected to the front side, and a first communication port for allowing the gas-receiving chamber to communicate with the first chamber, said airbag further including a cylindrical partition panel disposed in the main body to form the gas-receiving chamber and connected to a center of the inner panel, said partition panel having a first opening disposed at a center thereof, a second communication port for allowing the gas-receiving chamber to communicate with the first chamber through the first communication port, and a third communication port disposed at an end portion of the cylindrical partition panel for allowing the gas-receiving chamber to communicate with the second chamber.

8. An airbag according to claim 7, wherein said main body is formed of a front panel facing an occupant of a vehicle, and a rear panel located at a side opposite to the front panel and connected with each other at peripheral edge portions thereof to form a bag shape in an inflated state, said rear panel having a second opening to be connected to the inflator at a center thereof and arranged substantially concentrically with the first opening.

9. An airbag according to claim 1, further comprising a partition panel connected to the inner panel for partitioning the first chamber from the gas-receiving chamber.

10. An airbag device comprising the airbag according to claim 1, and an inflator for inflating the airbag.

* * * * *